(12) United States Patent
Kastel

(10) Patent No.: US 10,539,030 B2
(45) Date of Patent: Jan. 21, 2020

(54) GAS TURBINE ENGINE STATOR VANE PLATFORM REINFORCEMENT

(71) Applicant: United Technologies Corporation, Hartford, CT (US)

(72) Inventor: Donald Kastel, Hamden, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 628 days.

(21) Appl. No.: 14/767,478

(22) PCT Filed: Feb. 24, 2014

(86) PCT No.: PCT/US2014/017927
§ 371 (c)(1),
(2) Date: Aug. 12, 2015

(87) PCT Pub. No.: WO2014/133938
PCT Pub. Date: Sep. 4, 2014

(65) Prior Publication Data
US 2016/0003070 A1    Jan. 7, 2016

Related U.S. Application Data

(60) Provisional application No. 61/769,568, filed on Feb. 26, 2013.

(51) Int. Cl.
*F01D 9/04* (2006.01)
*F02C 3/04* (2006.01)

(52) U.S. Cl.
CPC ............ *F01D 9/04* (2013.01); *F02C 3/04* (2013.01); *F05D 2240/80* (2013.01)

(58) Field of Classification Search
CPC ... F01D 9/02; F01D 9/04; F01D 9/041; F01D 9/042; F01D 5/141; F01D 5/143;
(Continued)

(56) References Cited

U.S. PATENT DOCUMENTS 5,233,149 A * 8/1993 Killian .................. B23K 33/00
219/137 R
5,584,654 A   12/1996 Schaefer et al.
(Continued)

FOREIGN PATENT DOCUMENTS

EP     0753099    1/1999
EP     1505259    2/2005

OTHER PUBLICATIONS

International Preliminary Report on Patentability for PCT Application No. PCT/US2014/017927, dated Sep. 11, 2015.
(Continued)

*Primary Examiner* — Thai Ba Trieu
*Assistant Examiner* — Loren C Edwards
(74) *Attorney, Agent, or Firm* — Carlson, Gaskey & Olds, P.C.

(57) ABSTRACT

A stator vane for a gas turbine engine includes a first platform and a second platform radially spaced apart from one another. The first and second airfoils are circumferentially spaced from one another and interconnect the first and second platforms. The first platform has a gas path side facing the airfoils and a non-gas path side opposite the gas path side. A circumferentially extending rail provided on the first platform extends radially outward from the gas path side to the non-gas path side to form a pocket on the non-gas path side between the first platform and the rail. A reinforcement is arranged in the pocket and joins the first platform and the rail. The reinforcement includes a variable thickness in the circumferential direction and is arranged generally centrally between the first and second airfoils.

20 Claims, 2 Drawing Sheets

(58) Field of Classification Search
CPC .......... F01D 5/147; F01D 25/246; F02C 3/04; F05D 2240/125; F05D 2240/80; F05D 2250/60
USPC .......................................................... 60/805
See application file for complete search history.

(56) References Cited

U.S. PATENT DOCUMENTS

| | | |
|---|---|---|
| 7,160,078 B2 | 1/2007 | Cogn et al. |
| 8,192,166 B2 | 6/2012 | Beeck et al. |
| 8,257,037 B2 | 9/2012 | Tidsley |
| 2009/0169369 A1* | 7/2009 | Morgan .................. F01D 9/023 415/174.2 |
| 2009/0185893 A1 | 7/2009 | Propheter-Hinckley |
| 2012/0003078 A1 | 1/2012 | Pikul et al. |
| 2012/0148383 A1 | 6/2012 | Gear et al. |
| 2013/0034434 A1* | 2/2013 | Propheter-Hinckley ..................... F01D 9/042 415/208.1 |

OTHER PUBLICATIONS

The International Search Report and Written Opinion for PCT Application No. PCT/US2014/017927, dated May 26, 2014.

* cited by examiner

GAS TURBINE ENGINE STATOR VANE PLATFORM REINFORCEMENT

STATEMENT REGARDING FEDERALLY SPONSORED RESEARCH OR DEVELOPMENT

This invention was made with government support under Contract No. ME.3728 awarded by the United States Air Force. The Government has certain rights in this invention.

BACKGROUND OF THE INVENTION

This disclosure relates to a gas turbine engine stator vane. In particular, the disclosure relates to reinforcement for a platform of the stator vane at an intersection of the platform and rail.

A gas turbine engine typically includes a fan section, a compressor section, a combustor section and a turbine section. Air entering the fan and compressor sections is compressed and delivered into a combustor section where it is mixed with fuel and ignited to generate a high-speed exhaust gas flow. The high-speed exhaust gas flow expands through the turbine section to drive the compressor section. The turbine section typically includes high and low pressure turbines.

The turbine section typically includes stator vanes supported by static structure and are axially interspersed between arrays of turbine blades. One type of stator vane configuration uses multiple airfoils joined by common radially spaced apart inner and outer platforms, which may be referred to as a "doublet."

The outer platform typically supports a circumferentially extending rail that provides sealing features for axially adjacent structure. An axial pressure-induced load on the doublet causes compressive stress to be concentrated at the intersection of the outer platform and rail in a region between the airfoils.

A typical doublet design uses a constant fillet radius between the outer platform and the rail, which includes a constant or uniformly tapered thickness. Other designs have employed a pair of discreet circumferentially spaced gussets, which are relatively thin, for example a circumferential width of 0.10 inch (2.54 mm) or less.

SUMMARY OF THE INVENTION

In one exemplary embodiment, a stator vane for a gas turbine engine includes a first platform and a second platform radially spaced apart from one another. The first and second airfoils are circumferentially spaced from one another and interconnect the first and second platforms. The first platform has a gas path side facing the airfoils and a non-gas path side opposite the gas path side. A circumferentially extending rail provided on the first platform extends radially outward from the gas path side to the non-gas path side to form a pocket on the non-gas path side between the first platform and the rail. A reinforcement is arranged in the pocket and joins the first platform and the rail. The reinforcement includes a variable thickness in the circumferential direction and is arranged generally centrally between the first and second airfoils.

In a further embodiment, spaced apart hooks are supported by the first platform.

In a further embodiment of any of the above, circumferentially spaced apart side walls are supported on the first platform and forms a pocket.

In a further embodiment of any of the above, the hooks extend radially outward from the side walls.

In a further embodiment of any of the above, the first platform corresponds to an outer platform. The second platform corresponds to an inner platform.

In a further embodiment of any of the above, the reinforcement is located intermediately of the first and second airfoils.

In a further embodiment of any of the above, the reinforcement is thicker toward a center of the reinforcement as compared to circumferentially adjacent non-reinforced regions.

In a further embodiment of any of the above, the reinforcement has a circumferential width that is greater than 10% of a circumferential width of the rail.

In a further embodiment of any of the above, the circumferential width of the reinforcement is less than 50% of the circumferential width of the rail.

In a further embodiment of any of the above, the reinforcement is thicker than the non-reinforced region by at least 0.010 inch (0.25 mm)

In a further embodiment of any of the above, the reinforcement is less than 0.020 inch (0.50 mm)

In a further embodiment of any of the above, the reinforcement is provided by a fillet.

In another exemplary embodiment, a gas turbine engine includes compressor and turbine sections. A combustor is provided axially between the compressor and turbine sections. A turbine vane is in the turbine section that is supported by static structure. The vane includes a first platform and a second platform radially spaced apart from one another. The first and second airfoils are circumferentially spaced from one another and interconnect the first and second platforms. The first platform has a gas path side facing the airfoils and a non-gas path side opposite the gas path side. A circumferentially extending rail is provided on the first platform. The rail extends radially outward from the gas path side to the non-gas path side to form a pocket on the non-gas path side between the first platform and the rail. A reinforcement is arranged in the pocket and joins the first platform and the rail. The reinforcement includes a variable thickness in the circumferential direction and is arranged generally centrally between the first and second airfoils.

In a further embodiment of any of the above, the first platform corresponds to an outer platform. The second platform corresponds to an inner platform.

In a further embodiment of any of the above, the circumferential width of the reinforcement is between 10%-50% of the circumferential width of the rail.

In a further embodiment of any of the above, the reinforcement is less than 0.020 inch (0.50 mm)

In a further embodiment of any of the above, the reinforcement is thicker than the non-reinforced region by at least 0.010 inch (0.25 mm)

In a further embodiment of any of the above, the reinforcement is provided by a fillet.

In a further embodiment of any of the above, the reinforcement is located intermediately of the first and second airfoils. The reinforcement is thicker toward a center of the reinforcement as compared to circumferentially adjacent non-reinforced regions.

In a further embodiment of any of the above, spaced apart hooks are supported by the first platform and mounted to the static structure. Circumferentially spaced apart side walls are supported on the first platform and form a pocket. The hooks extend radially outward from the side walls.

These and other features may be best understood from the following specification and drawings, the following which is a brief description.

DETAILED DESCRIPTION

Figure 1:
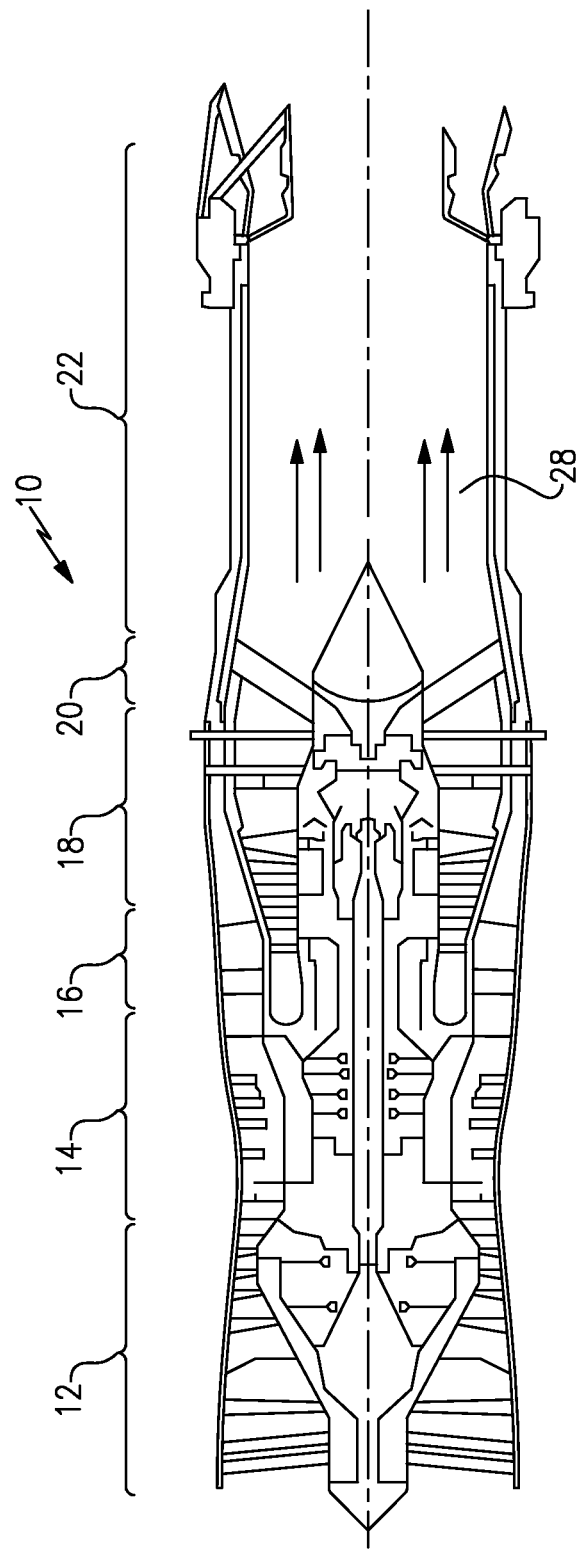
FIG. 1 is a schematic view of a gas turbine engine for a military application.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22.

Figure 2:
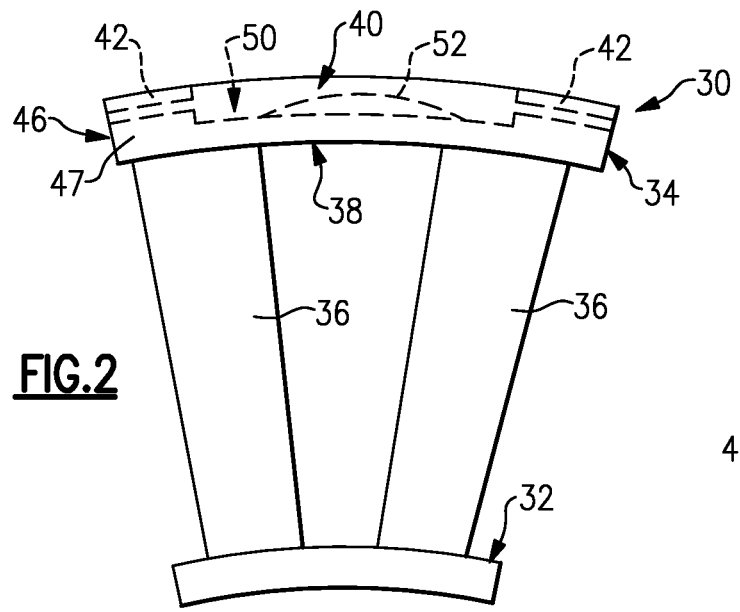
FIG. 2 is a schematic view of a stator vane doublet.

A stator vane doublet 30, or vane, is schematically shown in FIG. 2. The vane 30 may be cast from a high temperature metal alloy. The vane 30 includes radially spaced apart inner and outer platforms 32, 34. The inner and outer platforms 32, 34 are interconnected to one another by radially extending circumferentially spaced apart airfoils 36. The outer platform 34 includes a wall 39 having a gas path side 38 facing the airfoils 36 and a non-gas path side 40 opposite the gas path side 38 that includes a surface 49.

Figure 4:
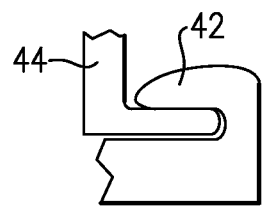
FIG. 4 is a partial cross-sectional view of a hook supported by a static structure.
Figure 3:
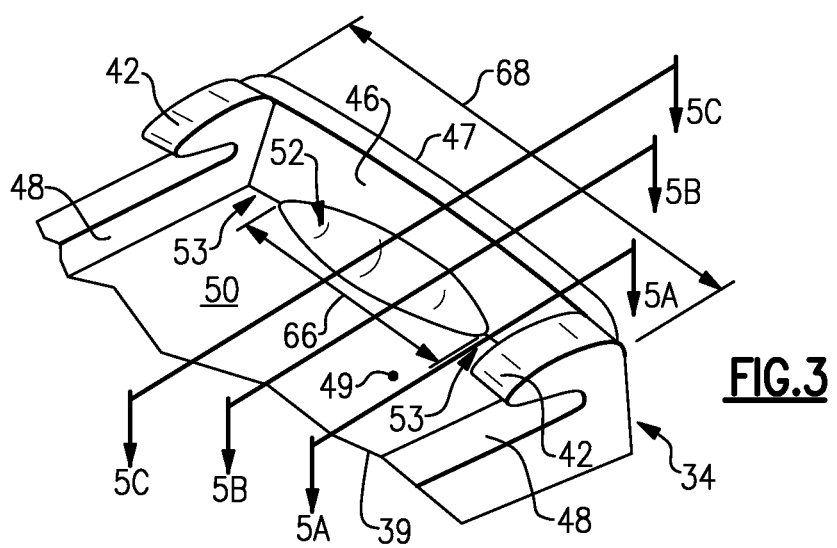
FIG. 3 is a perspective view of an outer platform of the doublet.

Referring to FIGS. 2-4, circumferentially spaced apart, discrete hooks 42 are provided on the non-gas path side 40 and are supported by a static structure 44, as best shown in FIG. 4. The static structure 40 corresponds to, for example, an outer case or an intermediate structure operatively supported by the outer case.

A rail 46 extends circumferentially between the hooks 42 and intersects the outer platform 34 on the non-gas path side. The rail 46 may provide sealing features on an axial face 47, shown in FIG. 2. Although the rail 46 is shown as being generally perpendicular to the surface provided by the non-gas path side 40, it could be oriented at any suitable angle.

Spaced apart side walls 48 extend axially from the hooks 42. A pocket 50 is provided by the rail 46 and the side walls 48. The static structure 48 may also include cooling features, such as protrusions that are disposed within the pocket 50.

A reinforcement 52 is arranged in the pocket 50 and interconnects the rail 46 to the surface 49. The reinforcement 52 is a variable thickness fillet, in one example, that extends circumferentially a width 66 that is between 10%-50% of the circumferential width 68 provided by the hooks 42, for example.

Figure 5A:
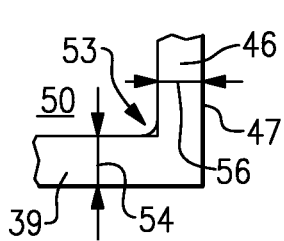
FIG. 5A is a cross-sectional view taken along line 5A-5A of FIG. 3.

A non-reinforced region 53 is provided on either side of the reinforcement 52 between the reinforcement 52 and the hooks 42. In the example, the reinforcement 52 is generally centrally located with respect to the airfoils 36, as best shown in FIG. 2. The non-reinforced region 53 has a first radial thickness 54 provided by the wall 39 and a first axial thickness 56 provided by a rail 46, as best shown in FIG. 5A. The reinforcement 52 is thickest at a central circumferential location of the vane 30 and gradually thins toward the non-reinforced region 53 to provide a thickened region that does not contribute to stress concentrations while resisting bending due to thermal and axial loads.

Figure 5B:
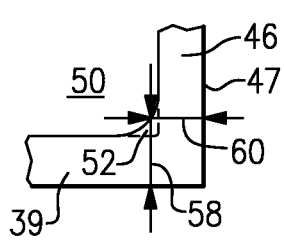
FIG. 5B is a cross-sectional view taken along line 5B-5B of FIG. 3.
Figure 5C:
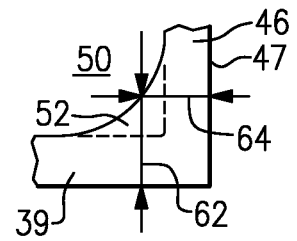
FIG. 5C is a cross-sectional view taken along line 5C-5C of FIG. 3.

The reinforcement 52 has a second radial thickness 58 of the wall 39 and a second axial thickness 60 of the rail 46, as shown in FIG. 5B. Near the center of the reinforcement 52, the wall 39 provides a third radial thickness 62 and the rail 46 provides a third axial thickness 64. The third radial and axial thickness 62, 64 are 0.010-0.020 inch (0.25-0.50 mm), for example. Although the fillet is shown as extending onto platform 34 and rail 46 generally equally, the fillet may extend a greater amount onto one of the structures, for example, the platform 334.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A stator vane for a gas turbine engine, comprising:
a first platform and a second platform radially spaced apart from one another;
first and second airfoils circumferentially spaced from one another and interconnecting the first and second platforms;
the first platform having a gas path side facing the airfoils and a non-gas path side opposite the gas path side, and a circumferentially extending rail provided on the first platform extending circumferentially from the first airfoil to the second airfoil and extending radially outward from the gas path side to the non-gas path side to form a radial extremity, and a pocket on the non-gas path side between the first platform and the rail; and
a reinforcement comprises a circumferential width that is radially inward of the radial extremity, the reinforcement is arranged in the pocket and joining the first platform and the rail, the reinforcement contacting the first platform and the rail, the reinforcement includes a variable thickness in the circumferential direction and is arranged generally centrally between the first and second airfoils, wherein the thickness is largest at a point centered between the first and second airfoils.

2. The stator vane according to claim 1, comprising spaced apart hooks supported by the first platform, the spaced apart hooks configured to engage an engine structure.

3. The stator vane according to claim 2, comprising circumferentially spaced apart side walls supported on the first platform and forming the pocket.

4. The stator vane according to claim 3, wherein the hooks extend radially outward from the side walls.

5. The stator vane according to claim 1, wherein the first platform corresponds to an outer platform, and the second platform corresponds to an inner platform.

6. The stator vane according to claim 1, wherein the reinforcement is located intermediately of the first and second airfoils.

7. The stator vane according to claim 1, wherein the reinforcement is thicker toward a center of the reinforcement as compared to circumferentially adjacent non-reinforced regions.

8. The stator vane according to claim 1, wherein the reinforcement has a circumferential width that is greater than 10% of a circumferential width of the rail.

9. The stator vane according to claim 8, wherein the circumferential width of the reinforcement is less than 50% of the circumferential width of the rail.

10. The stator vane according to claim 1, wherein the reinforcement is thicker than a non-reinforced region by at least 0.010 inch (0.25 mm).

11. The stator vane according to claim 1, wherein the reinforcement has a part that is less than 0.020 inch (0.50 mm).

12. The stator vane according to claim 1, wherein the reinforcement is provided by a fillet.

13. A gas turbine engine comprising:
compressor and turbine sections;
a combustor provided axially between the compressor and turbine sections;
a turbine vane in the turbine section that is supported by static structure and includes:
a first platform and a second platform radially spaced apart from one another;
first and second airfoils circumferentially spaced from one another and interconnecting the first and second platforms;
the first platform having a gas path side facing the airfoils and a non-gas path side opposite the gas path side, and a circumferentially extending rail provided on the first platform extending circumferentially from the first airfoil to the second airfoil and extending radially outward from the gas path side to the non-gas path side to form a radial extremity, and a pocket on the non-gas path side between the first platform and the rail; and
a reinforcement comprises a circumferential width that is radially inward of the radial extremity, the reinforcement is arranged in the pocket and joining the first platform and the rail, the reinforcement contacting the first platform and the rail, the reinforcement includes a variable thickness in the circumferential direction and is arranged generally centrally between the first and second airfoils, wherein the thickness is largest at a point centered between the first and second airfoils.

14. The gas turbine engine according to claim 13, wherein the first platform corresponds to an outer platform, and the second platform corresponds to an inner platform.

15. The gas turbine engine according to claim 13, wherein a circumferential width of the reinforcement is between 10%-50% of a circumferential width of the rail.

16. The gas turbine engine according to claim 13, wherein the reinforcement has a part that is less than 0.020 inch (0.50 mm).

17. The gas turbine engine according to claim 13, wherein the reinforcement is thicker than a non-reinforced region by at least 0.010 inch (0.25 mm).

18. The gas turbine engine according to claim 13, wherein the reinforcement is provided by a fillet.

19. The gas turbine engine according to claim 13, wherein the reinforcement is located intermediately of the first and second airfoils, and the reinforcement is thicker toward a center of the reinforcement as compared to circumferentially adjacent non-reinforced regions.

20. The gas turbine engine according to claim 13, comprising spaced apart hooks supported by the first platform and mounted to the static structure, circumferentially spaced apart side walls supported on the first platform and forming the pocket, wherein the hooks extend radially outward from the side walls.

* * * * *